United States Patent [19]

Kesselman

[11] 4,426,896
[45] Jan. 24, 1984

[54] TAMPER-PROOF FASTENER REMOVAL TOOL

[76] Inventor: David A. Kesselman, 16685 Arnold Dr., Sonoma, Calif. 95476

[21] Appl. No.: 328,684

[22] Filed: Dec. 8, 1981

[51] Int. Cl.³ .............................................. B25B 23/08
[52] U.S. Cl. ........................................ 81/441; 81/53.2
[58] Field of Search ...................... 81/53.2, 441, 451

[56] References Cited

U.S. PATENT DOCUMENTS

| 175,083 | 2/1917 | Tallyn | 81/441 |
| 1,785,847 | 12/1930 | Valentine | 81/441 |
| 2,480,648 | 8/1949 | Harer | 81/53.2 |
| 2,750,821 | 6/1956 | Hilsinger | 81/53.2 X |
| 3,457,812 | 7/1969 | Wagner | 81/53.2 |
| 3,739,825 | 6/1973 | Knox | 81/451 |
| 4,130,152 | 12/1978 | Bolen | 81/451 |
| 4,270,418 | 6/1981 | Shephard | 81/441 X |

Primary Examiner—James G. Smith
Attorney, Agent, or Firm—Sixbey, Friedman & Leedom

[57] ABSTRACT

A tool for removing an in situ tamper-proof fastener of the type disclosed in U.S. Pat. Nos. 4,037,515 and 4,225,165 includes spikes located and oriented on a body to snag the head of the fastener so that rotation imparted to the body is transferred to the fastener.

5 Claims, 8 Drawing Figures

U.S. Patent   Jan. 24, 1984   4,426,896
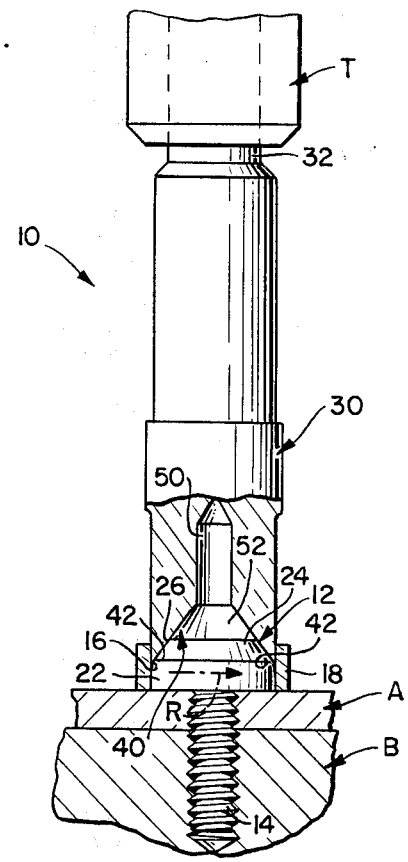
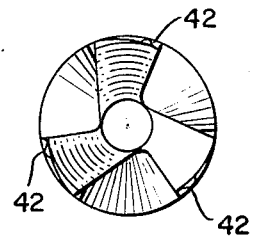
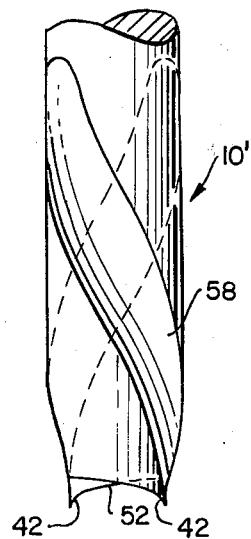
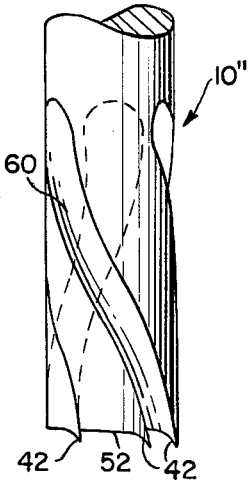
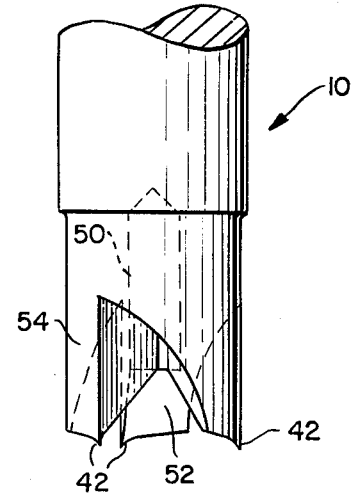
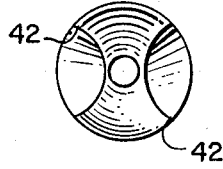
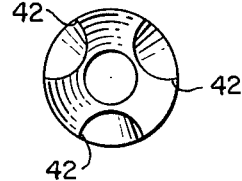
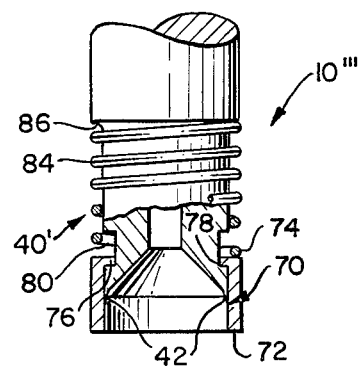

TAMPER-PROOF FASTENER REMOVAL TOOL

BACKGROUND OF THE INVENTION

The present invention relates in general to tools, and, more particularly, to a tool for removing fasteners.

Tamper-proof fasteners are disclosed in U.S. Pat. Nos. 4,037,515 and 4,225,165. These fasteners have proven to be extremely effective in tamper-proofing assemblies across a broad range of applications. However, in one application in particular, gas meters, there is need to remove such fasteners and nuts in an expeditious manner in order not to delay the rebuilding and servicing of such items in an assembly line setting. Any delay or difficulty can be extremely costly.

Furthermore, any tool used to effect such fastener removal must be a controlled item for the user and not available to the general public.

SUMMARY OF THE INVENTION

The device disclosed herein is used to expeditiously remove tamper-proof fasteners, such as those disclosed in the above-mentioned patents.

The device includes snagging means which snags the fastener so that rotation imparted to the removal tool is transferred to the fastener. This tool enables removal of tamper-proof fasteners quickly and expeditiously via an air gun, electric drill, manually, or the like.

The tool is preferably used with the afore-referenced tamper-proof fasteners, but can be adapted for removal of other threaded components, as necessary.

The tool includes a body having a square or round driving head and a plurality of cutting teeth spaced around the circumference of a concave head. This head fits over an in situ tamper-proof fastener and removes the fastener after the head of that fastener has been removed.

The cutting teeth are slightly hooked in order to dig into the fastener head, and preferably, are located at the widest circumference of the tool to obtain maximum leverage upon application of reverse torque to the fastener.

The teeth are located and designed to facilitate exact seating of the tool over a convex head of an in situ fastener, and the free turning sleeve or shield of that fastener helps to properly seat the removal tool.

By first applying a slight amount of reverse torque (counterclockwise) and pressing downwardly with some pressure at the same time, the multi-sharpened ends of the tool dig into the head and break the fastener loose. Then additional torque can be applied to remove the fastener expeditiously.

The removal tool disclosed herein actually removes tamper-proof fasteners quicker than conventional slotted type screws can be removed. The removal tool digs into the head of the in situ screw or nut and leaves an indication that the fastener has been removed. The cut marks or indentations cause the plating to be disturbed or marked and are easily observed. If an attempt to replace the screw is made, further marking will be evident. Also, reaching the proper tightness will be difficult. For control purposes, all tools should be serial numbered and controlled. Distribution is then on a limited basis only to approved customers.

An alternative embodiment of the tool includes a tube and is used to remove fasteners which do not have a shield.

OBJECTS OF THE INVENTION

It is a main object of the present invention to remove in situ tamper-proof fasteners.

It is another object of the present invention to remove in situ tamper-proof fasteners in a manner which produces an indication that the fastener has been removed.

It is still another object of the present invention to remove in situ tamper-proof fasteners in an expeditious manner.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is an elevation view of an in situ tamper-proof fastener coupled to a removal tool embodying the teachings of the present invention.

FIG. 2 is an end view of the removal tool embodying the teachings of the present invention.

FIG. 3 is an elevation view of a removal tool embodying the teachings of the present invention.

FIG. 4 is an elevation view of an alternative embodiment of a removal tool embodying the teachings of the present invention.

FIG. 5 is an end view of the FIG. 4 removal tool.

FIG. 6 is an elevation view of an alternative embodiment of a removal tool embodying the teachings of the present invention.

FIG. 7 is an end view of the FIG. 6 removal tool.

FIG. 8 is an elevation view of an alternative embodiment of a removal tool embodying the teachings of the present invention.

DETAILED DESCRIPTION OF THE INVENTION

Shown in FIG. 1 is a device 10 for removing a fastener 12. The fastener 12 is fully discussed in U.S. Pat. Nos. 4,037,515 and 4,225,165 and attention is directed thereto for full details thereof. The disclosures of these patents are incorporated herein by reference thereto. The fastener, in FIG. 1, is used to couple parts A and B together, and includes a threaded shank 14, a head 16 and a shield 18 attached to the head and shank to be freely rotatable thereabout. As discussed in the referenced patents, the shield 18 prevents a gripping tool, such as a wrench, or the like, from gripping the fastener head 16. Head 16 includes a lower portion 22 and an upper portion 24 which is in the form of a truncated cone with an outer surface 26, and a base having an outer diameter matching that of the lower portion 22.

The removal device 10 includes a trunk portion 30 and a shank 32. The shank is of any suitable cross-sectional configuration and is received in a torquing means, such as a power tool T, or the like. The torquing means imparts rotation to the device 10 so that device rotates about the longitudinal centerline thereof.

An end 40 of the device 10 is remote from the shank 32 and is adapted to contact the fastener 12. The end 40 includes spike-like hooks 42 (best shown in FIGS. 2 and 3) which are designed and oriented to snag the fastener 12 to initiate a removal operation. As above-discussed, this snagging marks the fastener to indicate that the fastener has been removed. The hooks 42 are formed, in one embodiment, by relieved areas on the device end 40. The hooks 42, in such embodiment, are thus spikes which project downwardly from end 40 and are angled with respect to the device longitudinal centerline and with respect to a transverse centerline of the device, i.e., angled to extend along the secant of a device which has a circular transverse cross-sectional shape.

As shown, the spikes 42 are forced into the outer surface of the fastener upper portion 24 and thus snag the fastener to couple the tool 10 to the fastener so that rotation of the tool is imparted to the fastener 12. The scarring of the fastener facilitates detection of an illegally removed fastener which has been replaced, thereby preventing such replacement and safeguarding against such illegal removal.

The spikes are located to engage the fastener near the outer perimeter of the upper portion as indicated in FIG. 1 for leverage purposes to thereby impart the maximum torque to the fastener during the removal process.

As shown in FIGS. 1-3, the removal tool has a bore 50 defined therein, but such bore is not necessary to the tool and can be deleted without departing from the scope of this disclosure. It is only necessary that there be some means, such as bore 52, defined on the tool end 40 accomodating the head 16 when the spikes snag that head. The outer dimension of the removal tool is selected to correspond to the inner diameter of the shield 18 so that shield can guide and support the tool during the removal process.

Any number of spikes can be used, but at least two are preferred to produce adequate gripping of the fastener. However, three or more can also be used.

Flutes 54 are formed in the trunk 30 of the tool 10 to facilitate the defining of the spikes. However, such flutes can be deleted without departing from the scope of this invention.

Other forms of the tool are shown in FIGS. 4-8, with FIG. 4 showing two spikes on a tool 10', and FIG. 6 showing three spikes on a tool 10'' with elongated flutes 58 and 60, respectively. The FIG. 4 tool is narrowed slightly near end 40 to properly fit into the shield 18, as discussed above. Different sized tools can be provided to remove different size fasteners.

The spikes can be oriented to snag and remove a right-handed fastener or a left-handed fastener, as necessary. A right-handed fastener is removed by turning that fastener counterclockwise, as indicated by arrow R in FIG. 1.

The power tool T is preferably a standard high speed drill, or the like, which is operated in the reverse mode thereof during the removal process. The removal tools shown in the figures can be fabricated from high speed hardened steel blanks known in the industry.

To remove a fastener 12, the tool 10 is oriented above that fastener and aligned therewith so the end 40 can be snugly received in the shield 18 and the fastener head snugly received in the receiving means 52. The tool is firmly pressed onto the fastener to set the spikes firmly against the fastener outer surface. With the tool in the reverse mode, power is slowly applied so the spikes snag the fastener, and then power can be increased if desired to back the fastener out.

As discussed above, the shield 18 surrounding the fastener head guides and restrains the tool 12 to prevent that tool from "walking" off the fastener head during the removal process. Shown in FIG. 8 is a removal tool 10''' for use with fasteners which do not have a shield 18.

The tool 10''' includes a lower end 40' having a guide tube 70 movably mounted thereon. The tube 70 performs the function that the shield 18 performs, that is, the tube 70 guides the tool during initial placement onto the in situ fastener and retains the tool in place on the fastener during the removal process.

In the FIG. 8 embodiment, the tube 70 is cylindrical and includes a bottom rim 72 and a top rim 74. An annular collar 76 is mounted on the top rim 74 and has an opening 78 defined therein. The tool lower end 40' includes a notch 80 in which the collar 76 is accommodated to retain the tube on the tool.

A biasing means, such as a spring 84, has one end seated against a shoulder 86 defined on the tool, and another end seated on the top surface of the tube upper rim 74. The biasing means urges the collar downwardly.

Spikes 42 extend downwardly from the tool end 40' and function and operate as discussed above.

Operation of the tool 10''' is similar to the operation of the tool 10, with the exception of the operation of the spring biased tube 70. Initially, the tool 10''' is aligned with a fastener to be removed so that the tube 70 surrounds that fastener. The tube is positioned over the fastener and pushed thereonto with the tube guiding the tool end 40' so the spikes 42 engage the outer surface of the fastener. The tool moves through the tube against the force of the spring 84 and the notch 80 moves past the collar. However, the collar remains captured in the notch 84. The remainder of the operation is similar to that discussed with regard to tool 10. After removal, the tool 10''' is separated from the fastener, and the spring causes the tube 70 to return to the position shown therefor in FIG. 8.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A removal tool for removing an in situ tamper-proof fastener of the type having a free turning shield surrounding a conical head of the fastener for preventing the grasping of that fastener head by a tool such as a wrench or the like, the removal tool comprising:
an elongate arcuate body having means thereon for engaging a torquing means; and
fastener head engaging means on said body, said fastener head engaging means including means for accomodating the fastener conical head and a plurality of spikes extending outwardly from said body, each of said spikes extending along a secant of said arcuate body being angled at an acute angle with respect to a longitudinal centerline of said elongate body and being at an acute angle with respect to a transverse centerline of said elongate body to form a snagging point which is located adjacent to the shield to snag the fastener head and couple that head to the body so that rotation imparted to said body by a power means is transferred to the fastener head.

2. The removal tool defined in claim 1 further including a plurality of flutes defined in said body, said spikes each being located on one end of each of said flutes.

3. The removal tool defined in claim 1 wherein said spikes are located closely adjacent an outer perimeter of said elongate body.

4. The removal tool defined in claim 3 further including a bore defined longitudinally of said elongate body.

5. A removal tool for removing an in situ tamper-proof fastener comprising:
 an elongate arcuate body having means thereon for engaging a torquing means; and
 fastener head engaging means on said body, said fastener head engaging means including means for accomodating the fastener head, a tube movably mounted on said body for surrounding the fastener, biasing means on said body urging said tube longitudinally along said body, and a plurality of spikes extending outwardly from said body, each of said spikes extending along a secant of said arcuate body being angled at an acute angle with respect to a longitudinal centerline of said elongate body and at an acute angle with respect to a transverse centerline of said elongate body to form a snagging point which is located adjacent to said tube to snag the fastener head and couple that head to the body so that rotation imparted to said body by a power means is transferred to the fastener head.

* * * * *